(12) United States Patent
Jung

(10) Patent No.: US 8,781,723 B2
(45) Date of Patent: Jul. 15, 2014

(54) NAVIGATION SYSTEM AND METHOD FOR GUIDING SPEED LIMITING INFORMATION BY BLOCK

(75) Inventor: Ju Han Jung, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 674 days.

(21) Appl. No.: 12/668,280

(22) PCT Filed: Jun. 28, 2008

(86) PCT No.: PCT/KR2008/003767
§ 371 (c)(1),
(2), (4) Date: Jan. 8, 2010

(87) PCT Pub. No.: WO2009/008610
PCT Pub. Date: Jan. 15, 2009

(65) Prior Publication Data
US 2010/0332114 A1  Dec. 30, 2010

(30) Foreign Application Priority Data

Jul. 9, 2007  (KR) .................. 10-2007-0068688

(51) Int. Cl.
*G01C 21/00* (2006.01)
*G01C 21/32* (2006.01)
*G01C 21/36* (2006.01)

(52) U.S. Cl.
CPC .............. *G01C 21/32* (2013.01); *G01C 21/367* (2013.01)
USPC ...................................................... 701/409

(58) Field of Classification Search
CPC ........ G01C 21/26; G01C 31/36; G01C 21/32; G01C 21/20; G01C 21/3682; G01C 21/3679; G01C 21/367; G08G 1/0969; G09B 29/106; B60R 25/33
USPC ......... 701/400, 409, 410, 426, 429, 448, 461, 701/465, 468
See application file for complete search history.

(56) References Cited

U.S. PATENT DOCUMENTS

| 4,426,691 | A | * | 1/1984 | Kawasaki ...................... 369/21 |
| 6,484,072 | B1 | * | 11/2002 | Anderson et al. .................. 701/9 |
| 7,526,103 | B2 | * | 4/2009 | Schofield et al. ............. 382/104 |
| 2002/0128774 | A1 | * | 9/2002 | Takezaki et al. .............. 701/211 |

(Continued)

FOREIGN PATENT DOCUMENTS

| CN | 1848193 A | 10/2006 |
| DE | 10118544 A1 | 11/2002 |

(Continued)

OTHER PUBLICATIONS

International Search Report for PCT/KR2008/003767, mailed Sep. 30, 2008.

(Continued)

*Primary Examiner* — Mary Cheung
(74) *Attorney, Agent, or Firm* — Fox Rothschild LLP

(57) ABSTRACT

A navigation system and method for providing notification of speed limit information for each block is provided. The method includes: maintaining a database which stores a start point and an end point of a speed limited block, and a speed limit for each block; sensing whether a speed limited block exists in a front area while driving on a predetermined route; and providing a speeding alert notification within the determined speed limited block when the speed limited block is sensed.

15 Claims, 5 Drawing Sheets

(56) References Cited

U.S. PATENT DOCUMENTS

| | | | |
|---|---|---|---|
| 2003/0176198 A1* | 9/2003 | Chisholm | 455/463 |
| 2004/0075582 A1* | 4/2004 | Bergan et al. | 340/936 |
| 2004/0107037 A1* | 6/2004 | Straub | 701/93 |
| 2004/0128353 A1* | 7/2004 | Goodman et al. | 709/204 |
| 2005/0264404 A1* | 12/2005 | Franczyk et al. | 340/441 |
| 2006/0129315 A1* | 6/2006 | Kanematsu | 701/210 |
| 2007/0027612 A1* | 2/2007 | Barfoot et al. | 701/117 |
| 2007/0219709 A1* | 9/2007 | Ikeda | 701/207 |

FOREIGN PATENT DOCUMENTS

| | | |
|---|---|---|
| KR | 10-2000-0012959 | 3/2000 |
| KR | 10-2001-0061772 | 7/2001 |
| KR | 10-2005-0118260 | 12/2005 |
| KR | 1020050118260 | 12/2005 |
| WO | 2008/002126 | 1/2008 |

OTHER PUBLICATIONS

Written Opinion of the International Searching Authority, mailed Sep. 30, 2008.

Chinese Office Action issued in Chinese Application Serial No. 200880105746.1, dated Dec. 12, 2011.

European Search Report Issued Nov. 22, 2012, cited in European Patent Application No. 08766658.2.

* cited by examiner

NAVIGATION SYSTEM AND METHOD FOR GUIDING SPEED LIMITING INFORMATION BY BLOCK

This application is the U.S. national phase of International Application No. PCT/KR2008/003767, filed 28 Jun. 2008, which designated the U.S. and claims priority to KR 10-2007-0068688 filed 9 Jul. 2007, the entire contents of each of which are hereby incorporated by reference.

TECHNICAL FIELD

The present invention relates to a navigation system, and more particularly, to a navigation system for providing a guiding service in correspondence to a regulation for a block where a speed limit is in force for each block.

BACKGROUND ART

Users generally install various equipments in a moving body for their own conveniences and safe driving, and, are currently provided with a destination guide when equipping a navigation system.

The navigation system receives data such as longitude, latitude, and height from a Global Positioning System (GPS) satellite in orbit above the earth, thereby calculating a present location of the moving body based on the received data. Also, based on the calculated location of the moving body, a present location of the moving body is reported, an optimal route to a desired destination is calculated, and a user is guided according to the calculated route. Consequently, various information helpful for user's driving may be provided to the user.

In addition, since a speed limit is set for each road and apparatuses for detecting speeding by unmanned cameras may be installed anywhere, it is preferable to lower a speed of a moving body to be under a speed limit of a driving route. Accordingly, the navigation system displays a speed limit defined in each road by ascertaining the driving road in real-time, or provides a notification which advises caution, such as outputting a voice to lower a driving speed.

In a conventional method, it is typical to monitor violations of a speed limit at a specific point on a road, however, recently, a method for monitoring violations of a speed limit for each block by measuring an average speed for each block, not at a specific point, is introduced. Namely, a regulated block is defined as being a type in the conventional method of regulating speed at a point, conversely, a regulation block is defined as being a type in the recent method of regulating speed in each entire block with a predetermined distance.

The method for regulating speed for each block is to measure a passing of time of a moving body by installing an unmanned camera at a start point and an end point of a specific block, and thereby making it possible to regulate speed at a point without an unmanned camera and to regulate speed at the start point and the end point, which is different from the conventional method in that it is possible to avoid being monitored by avoiding a point where the regulation camera is installed.

DISCLOSURE OF INVENTION

Technical Goals

A conventional navigation system corresponds to the method for regulating speed at a specific point and has a problem of providing a speeding alert notification in correspondence to the new method for regulating speed.

Also, the conventional navigation system may not sense a speed of a moving body when driving on a shadow area due to a Global Positioning System (GPS) signal error caused by location data not being received. That is, when each of a speed limited block includes a shadow area, information regarding a speed may not be obtained, thus there is a problem to provide notification of a speed limit or to provide a speed alert notification for each block.

The present invention provides a navigation system and a method for providing notification of a speed limit for each block which can provide notification of a speed limit for each road corresponding to a regulation on speed limit for each block.

The present invention also provides a navigation system and a method for providing a speed limit for each block which can provide notification of a speed limited block by obtaining reliable information with respect to the speed limited block including a shadow area.

Technical Solutions

According to the present invention, there is provided a method for notifying of speed limit information for each block of a navigation system including: maintaining a database which stores a start point and an end point of a speed limited block, and a speed limit for each block; sensing whether a speed limited block exists in a front area while driving on a predetermined route; and providing an speeding alert notification within the determined speed limited block when the speed limited block is sensed.

According to the present invention, there is provided a navigation system including: a database storing a start point and an end point of a speed limited block, and a speed limit for each block, the speed limited block being defined with a speed limit covering an entire nation; and a control unit providing a speeding alert notification, when a speed limited block is sensed while driving a predetermined route, while driving on a speed limited block, wherein the control unit calculates an estimated passage time required for passing through the speed limited block based on a start point and an end point corresponding to the speed limited block and the speed limit, and provides notification about the speed limit with the calculated estimated passage time.

Advantageous Effects

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. Therefore, it is intended that the scope of the invention be defined by the claims appended thereto and their equivalents.

BEST MODE FOR CARRYING OUT THE INVENTION

The present invention may provide a new notification service in correspondence to a regulation on speeding by each block, thereby providing a speeding alert notification which suggests safe driving in preparation for a regulation by each block. In particular, more reliable information may be obtained by considering a speed limited block including a shadow area, thereby providing a speeding alert notification with respect to a driving speed of a moving body.

Hereinafter, a navigation system and a method for providing notification of speed limit information for each block according to exemplary embodiments of the present invention will be described in detail by referring to accompanied drawings.

First, a configuration of a navigation system for providing a speeding alert notification for each block according to the present invention will be described.

Figure 1:
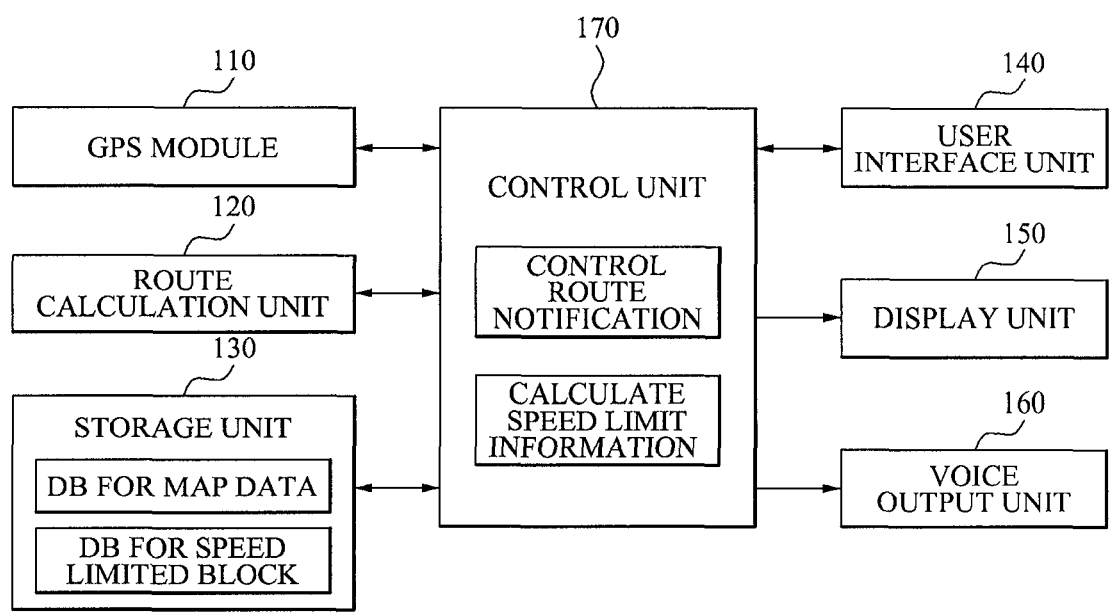
FIG. 1 is a diagram illustrating a configuration of a navigation system for providing notification of a speed limit for each block according to an embodiment of the present invention.

FIG. 1 is a diagram illustrating a configuration of a navigation system for providing notification of a speed limit for each block according to an embodiment of the present invention.

The present invention relates to a navigation system including a Global Positioning System (GPS) module 110 which calculates its own location by receiving location signals from at least three GPS satellites.

The navigation system according to the present invention is a user terminal which provides guidance of a driving route to a destination designated by the user, in particular, has a feature in providing an estimated amount of time required for passing through a corresponding block and a speed limit within a speed limited block when the speed limited block is sensed while driving along the driving route.

The navigation system according to the present invention includes a route calculation unit 120, a storage unit 130, a user interface unit 140, a display unit 150, a voice output unit 160, and a control unit 170.

The storage unit 130 includes a map database which builds map data for a national map and route information data associated with map data. The storage unit 130 stores a control program controlling overall operations of the navigation system including a route guide function and a speeding alert notification function within a speed limited block while guiding the route.

The storage unit 130 further includes a speed limited block database storing a start point and an end point of the speed limited block defining speed limits for the national map, and a speed limit for each speed limited block.

A traffic information center defines speed limited blocks for all roads in the nation, considers features of all roads, and defines a start point, an end point, and a speed limit of each speed limited block.

The navigation system collects the above mentioned information from the traffic information center to build the speed limited block database including the start point, end point, and speed limit of the each speed limited block.

The route calculation unit 120 ascertains a present location of a user using the GPS signals received via the GPS module 110, and generates route information by searching for a moving route to a destination designated by the user from the present location based on the map data stored in the map database of the storage unit 130.

The control unit 170 performs route guidance based on changes of the driving route based on the route information generated in the route calculation unit 120. Also, a speeding alert notification for a corresponding speed limited block is provided when the speed limited block is determined while driving along a predetermined route of which a destination is not designated, as well as the driving route.

Also, the display unit 150 is to display every kind of display content according to operations in the whole system and to display map information for providing guidance about the route, which can use a Liquid Crystal Display (LCD), Electro Luminescence (EL), and the like.

The user interface unit 140 is to input user command with respect to a navigation system, such as inputting a destination of a route guidance function and the like. Also, the user interface unit 140 is comprised of a touch pad integrated with the display unit 150, and thereby can provide a graphical user interface. Every menu environment related to the route guidance function of the navigation system is displayed on a graphic screen through the display unit 150 and a user can input a command by touching a specific location on the graphic screen with a stylus pen, finger, and the like.

The voice output unit 160 is a device for performing a voice notification while providing route guidance of the driving route, and outputs various voice notifications suggesting safe driving or suggesting to lower a driving speed when a speeding alert notification for the speed limited block is provided.

Figure 2:
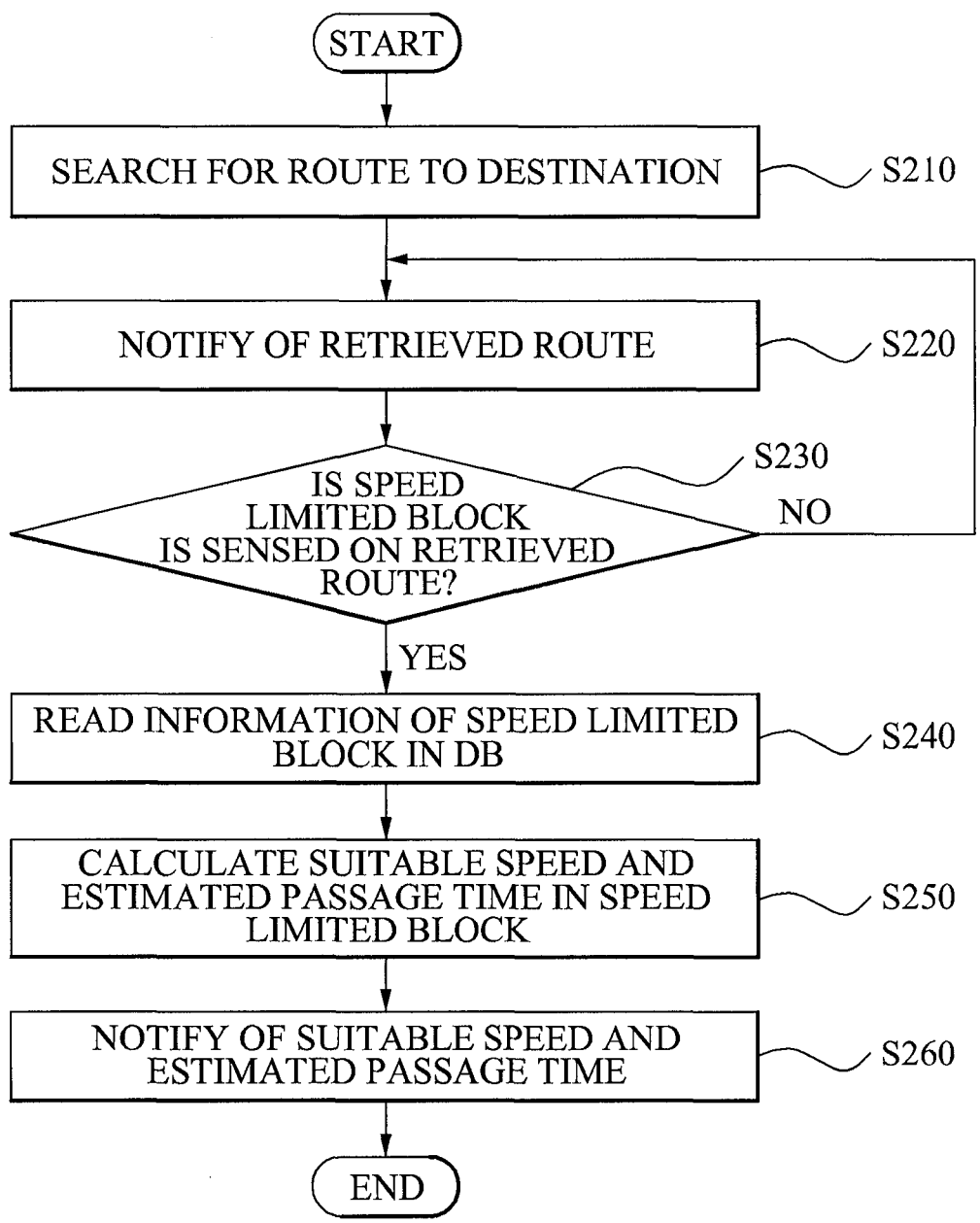
FIG. 2 is a flowchart illustrating operations of a method for notifying of speed limit information for each block according to an embodiment of the present invention.

Referring to FIG. 2, detailed operations regarding controls of the control unit 170 of FIG. 1 for providing notification of the speed limited block will be described.

As illustrated, when a user sets a destination of the route guidance function, a route to the set destination is searched for based on a current location in operation S210.

Next, a map corresponding to the retrieved route is provided and map matching is performed for the present location of the user on the map. Namely, a route guidance is performed, in operation S220, by providing a map screen and a voice notification for the retrieved map so that the user can drive along the retrieved route.

In operation S230, whether a speed limited block is sensed within the retrieved route based on the present location of the user while driving along the retrieved route is determined. Such operation may be performed by way of determining whether coordinates corresponding to a start point of the speed limited block exist in a front area at a predetermined distance by referring to information associated with the map data stored in the storage unit 130 and the speed limited block.

As a result of the determination in operation S230, when the speed limited block is sensed, database information corresponding to the sensed speed limited block is read from the speed limited block database. That is, a speed limit set in the start point and end point of the sensed speed limited block and a corresponding block are read in operation S240.

Figure 3:
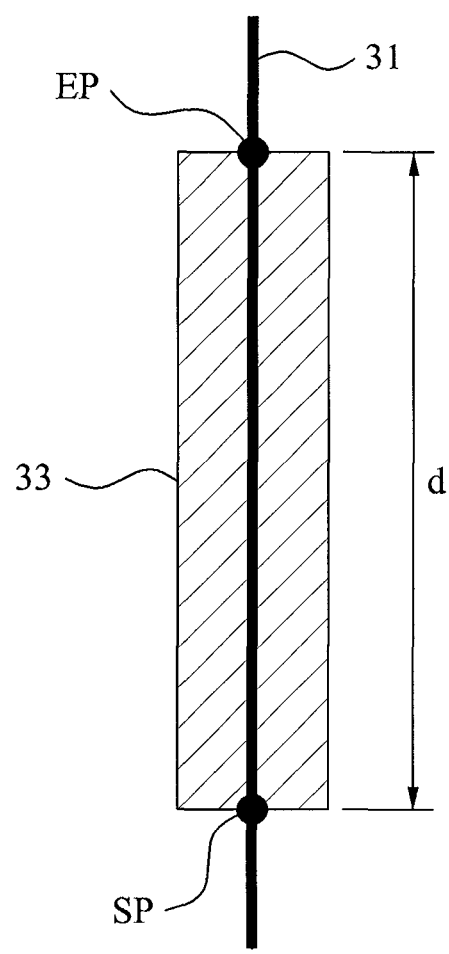
FIG. 3 is a diagram illustrating a speed limit for each block and a method for calculating an estimated passage time according to an embodiment of the present invention.

FIG. 3 is a diagram illustrating an example of a speed limited block with a speed limit set.

As illustrated in FIG. 3, the speed limited block is for defining speed limits for all blocks with a predetermined distance 'd' in a road 31 for regulating speed for each block. The speed limited block may be defined by designating a starting point (SP) where a regulation starts and an end point (EP) where a regulation ends. In particular, it is usual that a speed limited block where a speed limited is defined for each block includes a shadow area 33.

A speeding alert notification is provided for the sensed speed limited block when the speed limited block is sensed.

Types of the speeding alert notification may be variously configured.

First, the speeding alert notification notifies speed limits of corresponding blocks until arriving at a point corresponding to the end point of the speed limited block from a point corresponding to the start point of the speed limited block. In this instance, the speed limit may be continually displayed in a predetermined location on a screen of a map or a voice notification may be repeated at predetermined time periods.

Second, when the speed limited block is sensed, a distance 'd' of a corresponding speed limited block is calculated using the read start point and end point, and an estimated passage time is calculated using the calculated distance 'd' and the read speed limit. Subsequently, the calculated estimated passage time and the speed limit in the corresponding block are reported until arriving at the point corresponding to the end point from the point corresponding to start point. Similarly, the speed limit and the estimated passage time may be continually displayed on the screen of the map or a voice notification may be repeated at predetermined time periods.

The estimated passage time may be calculated by, $$x(min)=d(km)/LS(km/60\ min) \quad \text{[Equation 1]}$$

(x: estimated passage time, d: distance of speed limited block, LS: speed limit)

Third, when the speed limited block is sensed, an estimated passage time required for passing through the speed limited block is calculated using Equation 1, and a suitable speed for the speed limited block is determined based on the read speed limit. Also, the determined suitable speed is reported with the calculated estimated passage time until arriving at the point corresponding to the end point from the point corresponding to the start point. Similarly, the estimated passage time and the suitable speed may be displayed on the screen of the map or a voice notification may be repeated with a predetermined time period.

The suitable speed may be determined in a method of deducting a predetermined speed from the speed limit in the speed limited block, for example 10 km/h.

Fourth, when the speed limited block is sensed, a suitable speed is determined using the above method based on the speed limit for the speed limited block, and an estimated passage time required for passing through the speed limited block is calculated using the determined suitable speed and the distance 'd' of the speed limited block in operation S250. In this instance, the estimated passage time is calculated by applying the suitable speed instead of the speed limit in Equation 1. In operation S260, the determined suitable speed is reported with the calculated estimated passage time until arriving at the point corresponding to the end point from the point corresponding to the start point. Similarly, the estimated passage time and the suitable speed may be continually displayed on the screen of the map or a voice notification may be repeated with a predetermined time period.

Also, during the course of displaying the estimated passage time, a present time of passing through the start point of the speed limited block is determined, and the estimated passage time may be displayed with the present time.

Figure 4:
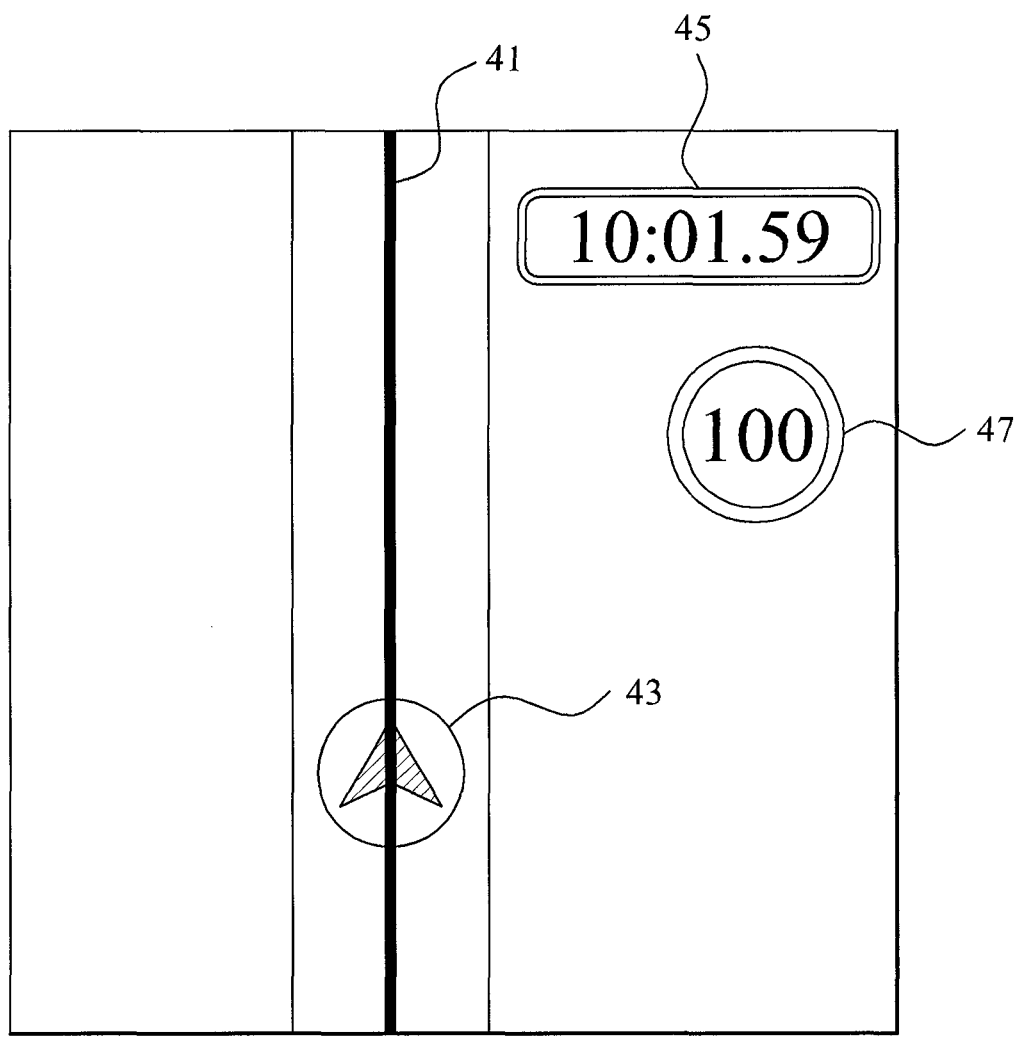
FIGS. 4 and 5 are diagrams illustrating examples of user interface screens providing an estimated passage time with a speed limit according to an embodiment of the present invention.
Figure 5:
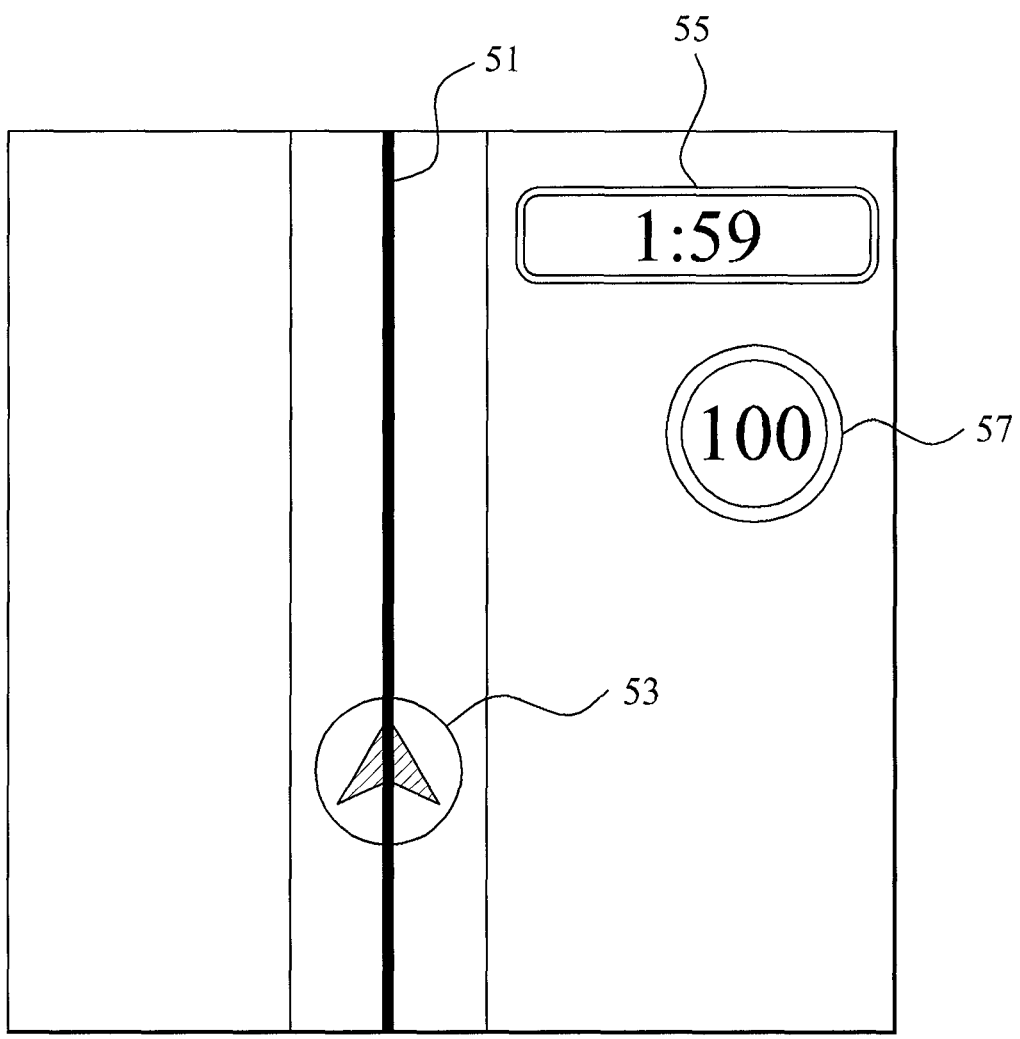

FIGS. 4 and 5 are diagrams illustrating examples of user interface screens providing an estimated passage time with a speed limit or a suitable speed according to an embodiment of the present invention.

FIG. 4 is a diagram illustrating that a present time of passing through the start point of the speed limited block and an estimated passage time are displayed.

As illustrated in FIG. 4, a speed limited block is sensed while a moving body 43 drives along a route 41, a speed limit or a suitable speed 47 is displayed with an estimated passage time 45 while passing through the speed limited block.

In this instance, the estimated passage time 45 may be displayed by including a present time of passing through a start point of the speed limited block. As an example, when a present time is 10 and an estimated passage time is 1 minute and 59 seconds, as illustrated in FIG. 4, it may be displayed as "10 (present time): 01.59 (estimated passage time)".

FIG. 5 is a diagram illustrating that a speed limit for the speed limited block or a suitable speed and an estimated passage time are displayed, a speed limit or a suitable speed 57 is displayed with an estimated passage time 55 while driving on the speed limited block in the case a speed limited block is sensed, as illustrated in FIG. 5. In this instance, the estimated passage time 55 may be displayed in a type of time sequences while driving on the speed limited block using a countdown according to a time unit.

When the estimated passage time is provided, a shadow area is considered in a regulation by a block, and it is possible to provide a speeding alert notification in the case of inability of sensing a speed of a moving body in the shadow area.

Also, in the case of a speed limited block without a shadow area, a driving speed of a moving body is sensed at a predetermined time period while driving along the speed limited block. Also, when the sensed driving speed surpasses a speed limit or a suitable speed, a notification suggesting caution may be provided to a user, such as a voice notification suggesting to reduce the driving speed of the moving body.

Thus, the present invention provides a notification service for a speed limited block in correspondence to a new regulation for speeding, and a notification suggesting caution is provided to a user being notified of a speed limit of a corresponding speed limited block and an estimated passage time required for passing through the corresponding speed limited block by considering the speed limited block including a shadow area.

The method for notifying of a speed limit for each block in a navigation system according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, the present invention is not limited to the described embodiments.

Instead, it would be appreciated by those skilled in the art that changes may be made to these embodiments without departing from the principles and spirit of the invention, the scope of which is defined by the claims and their equivalents.

The invention claimed is:

1. A method for notifying of speed limit information for each block of a navigation system, the method comprising:

maintaining a database which stores a start point and an end point of a speed limited block, and a speed limit for each block wherein the speed limited block includes a shadow area;

sensing whether a speed limited block exists in a front area while driving on a predetermined route; and providing a speeding alert notification within the determined speed limited block when the speed limited block is sensed wherein the providing comprises displaying the speed alert notification on the screen of a map or notifying by voice repeatedly with a predetermined time period.

2. The method of claim 1, wherein the providing of the speeding alert notification within the determined speed limited block comprises:

reading a start point, an end point, and a speed limit of a corresponding block in the database when the speed limited block is sensed;

providing notification of the speed limit read from a point corresponding to the start point of the speed limited block to a point corresponding to the end point of the speed limited block.

3. The method of claim 1, wherein the providing of the speeding alert notification within the determined speed limited block comprises:

reading a start point, an end point, and a speed limit of a corresponding block in the database when the speed limited block is sensed;

calculating a distance of the speed limited block using the read start point and the end point;

calculating an estimated passage time required for passing through the speed limited block using the read speed limit and the calculated distance; and providing notification of the calculated estimated passage time and the speed limit read from the point corresponding to the start point of the speed limited block to the point corresponding to the end point of the speed limited block.

4. The method of claim 3, wherein the providing of the speeding alert notification within the determined speed limited block further comprises:

notifying of present time information of passing through the start point of the speed limited block with the estimated passage time.

5. The method of claim 3, wherein the providing of the speeding alert notification within the determined speed limited block further comprises:

sensing user's moving speed within the speed limited block; and providing an alert notice with respect to the user's moving speed when a sensed moving speed surpasses the speed limit or the suitable speed.

6. The method of claim 1, wherein the providing of the speeding alert notification within the determined speed limited block comprises:

reading a start point, an end point, and a speed limit of a corresponding block in the database when the speed limited block is sensed;

calculating a distance of the speed limited block using the read start point and the end point;

calculating an estimated passage time required for passing through the speed limited block using the read speed limit and the calculated distance;

determining a suitable speed for the speed limited block based on the read speed limit;

providing notification of the calculated estimated passage time and the determined suitable speed from the point corresponding to the start point of the speed limited block to the point corresponding to the end point of the speed limited block.

7. The method of claim 6, wherein the suitable speed is determined by considering a predetermined speed using the read speed limit.

8. The method of claim 6, wherein the providing of the speeding alert notification within the determined speed limited block further comprises:

notifying of present time information of passing through the start point of the speed limited block with the estimated passage time.

9. The method of claim 6, wherein the providing of the speeding alert notification within the determined speed limited block further comprises:

sensing user's moving speed within the speed limited block; and providing an alert notice with respect to the user's moving speed when a sensed moving speed surpasses the speed limit or the suitable speed.

10. The method of claim 1, wherein the providing of the speeding alert notification within the determined speed limited block comprises:

reading a start point, an end point, and a speed limit of a corresponding block in the database when the speed limited block is sensed;

calculating a distance of the speed limited block using the read start point and the end point;

determining a suitable speed for the speed limited block based on the read speed limit;

calculating an estimated passage time required for passing through the speed limited block using the read speed limit and the calculated distance;

providing notification of the calculated estimated passage time and the determined suitable speed from the point corresponding to the start point of the speed limited block to the point corresponding to the end point of the speed limited block.

11. The method of claim 10, wherein the suitable speed is determined by considering a predetermined speed using the read speed limit.

12. The method of claim 10, wherein the providing of the speeding alert notification within the determined speed limited block further comprises:

notifying of present time information of passing through the start point of the speed limited block with the estimated passage time.

13. The method of claim 10, wherein the providing of the speeding alert notification within the determined speed limited block further comprises:

sensing user's moving speed within the speed limited block; and providing an alert notice with respect to the user's moving speed when a sensed moving speed surpasses the speed limit or the suitable speed.

14. At least one non-transitory computer-readable storage medium storing instructions for implementing a method for notifying of speed limit information for each block of a navigation system, the method comprising:

maintaining a database which stores a start point and an end point of a speed limited block, and a speed limit for each block wherein the speed limited block includes a shadow area;

sensing whether a speed limited block exists in a front area while driving on a predetermined route; and providing a speeding alert notification within the determined speed limited block when the speed limited block is sensed wherein the providing comprises displaying the speed alert notification on the screen of a map or notifying by voice repeatedly with a predetermined time period.

15. A navigation system comprising:

a database storing a start point and an end point of a speed limited block, and a speed limit for each block, the speed limited block being defined with a speed limit covering an entire nation wherein the speed limited block includes a shadow area; and a control unit providing a speeding alert notification, when a speed limited block is sensed while driving a predetermined route, while driving on a speed limited block, wherein the control unit calculates an estimated passage time required for passing through the speed limited block based on a start point and an end point corresponding to the speed limited block and the speed limit, provides notification about the speed limit with the calculated estimated passage time, and displays the speed alert notification on the screen of a map or notifies by voice repeatedly with a predetermined time period.

* * * * *